United States Patent
Clever et al.

(10) Patent No.: US 9,518,644 B1
(45) Date of Patent: Dec. 13, 2016

(54) SLIDING CAMSHAFT WITH IMPROVED COMPRESSIVE RESIDUAL STRESS

(71) Applicant: GM GLOBAL TECHNOLOGY OPERATIONS LLC, Detroit, MI (US)

(72) Inventors: Glenn E. Clever, Washington, MI (US); Jason J. Wiedyk, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/721,404

(22) Filed: May 26, 2015

(51) Int. Cl.
*F16H 53/00* (2006.01)
*C23C 8/04* (2006.01)
*F16H 53/02* (2006.01)

(52) U.S. Cl.
CPC ............. *F16H 53/025* (2013.01); *C23C 8/04* (2013.01)

(58) Field of Classification Search
CPC .......... F16H 53/025; F16H 53/04; C23C 8/04; B21D 53/845; F01L 2001/0471; F01L 2001/0473; F01L 2001/0475; F01L 1/047; F01L 1/16
See application file for complete search history.

(56) References Cited

U.S. PATENT DOCUMENTS

| | | | |
|---|---|---|---|
| 5,850,695 A * | 12/1998 | Klaas | B21D 53/845 29/525 |
| 6,966,954 B2 * | 11/2005 | Rhoads | C21D 1/78 148/208 |
| 8,474,136 B2 * | 7/2013 | Bechtold | B23P 15/00 29/458 |
| 8,584,639 B2 * | 11/2013 | Elendt | F01L 13/0036 123/90.18 |
| 8,662,043 B2 * | 3/2014 | Dollinger | B21D 53/845 123/90.16 |
| 9,032,597 B2 * | 5/2015 | Zhmud | C10M 125/22 29/90.01 |
| 9,038,584 B2 * | 5/2015 | Kashiwabara | F01L 1/047 123/90.15 |
| 9,097,144 B2 * | 8/2015 | Kappler | F01L 1/34413 |
| 9,261,177 B2 * | 2/2016 | Binder | B21D 53/845 |
| 9,309,786 B2 * | 4/2016 | Kashiwabara | F01L 1/047 |

FOREIGN PATENT DOCUMENTS

DE     102011018503 A1 * 10/2012 ............. F01L 1/053

* cited by examiner

*Primary Examiner* — Adam D Rogers
(74) *Attorney, Agent, or Firm* — Quinn Law Group, PLLC

(57) ABSTRACT

A sliding camshaft for shifting to a selected one of a plurality of selectable cam lobes includes an inner shaft and an outer shaft. The inner shaft has an external spline. The outer shaft has an inner surface, an outer surface, a coating, and an outer portion. The inner surface is subjectable to wear and is configured with an internal spline for transferring torque from and sliding axially on the external spline of the inner shaft. The outer surface is subjectable to wear and loading and is configured with the plurality of selectable cam lobes. The coating on the inner surface is for wear resistance. The outer portion is case hardened for wear resistance of the outer surface and to create a compressive residual stress in the outer portion for load carrying capability.

20 Claims, 4 Drawing Sheets

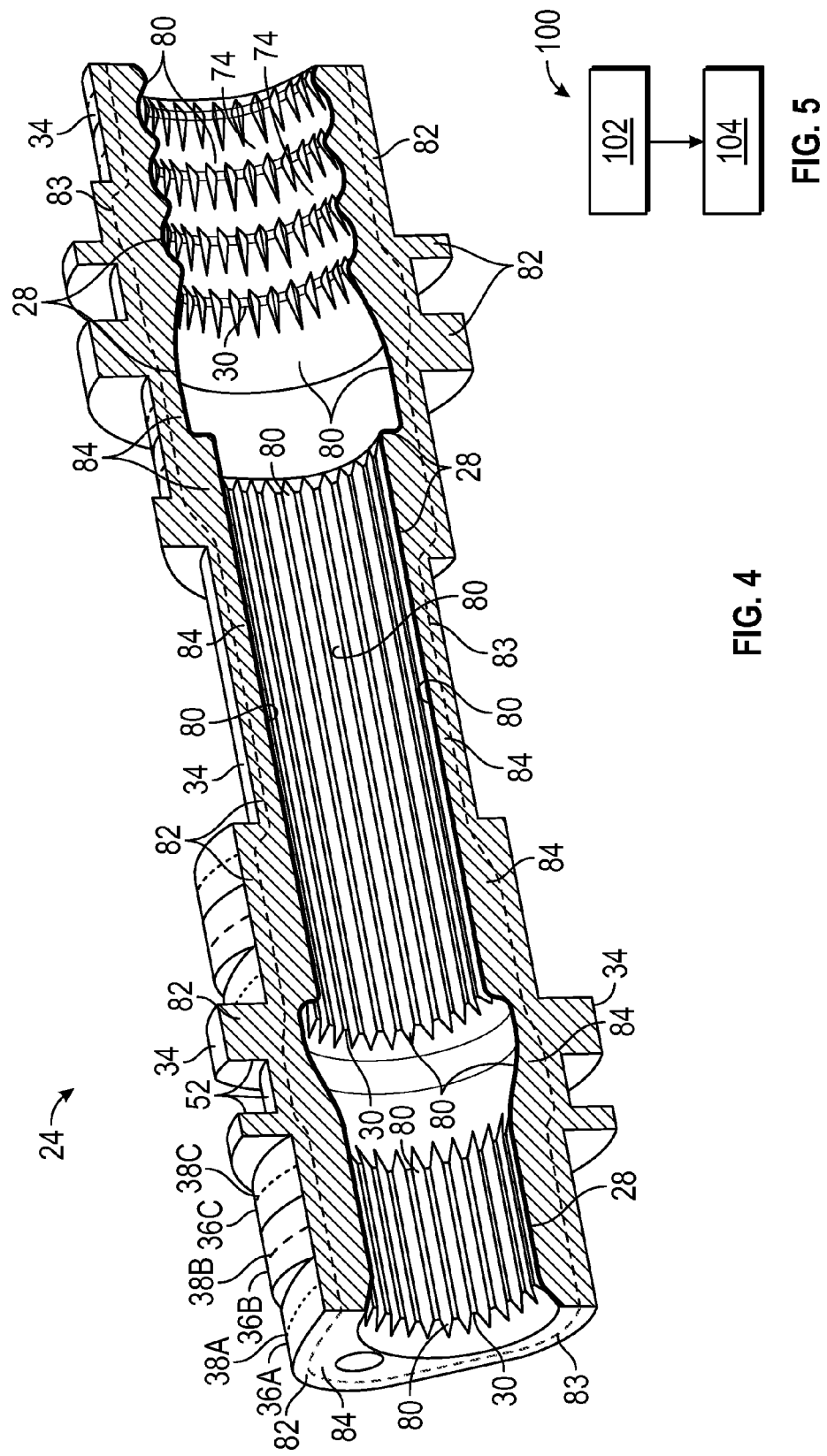

SLIDING CAMSHAFT WITH IMPROVED COMPRESSIVE RESIDUAL STRESS

TECHNICAL FIELD

This disclosure relates to a sliding camshaft with improved compressive residual stress capability.

BACKGROUND

A vehicle typically includes an engine having a rotating camshaft and valves. The camshaft opens and closes the valves via a cam follower that follows a cam lobe on the rotating camshaft. The camshaft may be a sliding camshaft having an outer sliding shaft that is splined to an inner shaft. The sliding camshaft enables the cam lobe to be changed to an alternative cam lobe by sliding the outer shaft relative to the inner shaft in order to present the alternative cam lobe to the cam follower. One or more alternative cam lobes may be included on the sliding camshaft to enable engine power, efficiency, and/or other engine performance characteristics to be modified.

Both the inner and the outer surfaces of the outer shaft must be hardened for wear resistance. In addition, compressive residual stress in the outer portion of the outer shaft enables the sliding camshaft to operate under higher loading conditions, which may improve engine performance. Because the outer shaft has relatively thin walls, conventional heat treating processes result in hardening of the entire outer shaft, leaving little or no capacity for compressive residual stress in the outer portion of the outer shaft.

SUMMARY

An outer shaft, a sliding camshaft, and a method are disclosed herein. The outer shaft has an outer surface subjectable to wear and loading and an inner surface subjectable to wear and configured with an internal spline for transferring torque from and sliding axially on an externally splined inner shaft. The outer shaft includes a coating on the inner surface for wear resistance and an outer portion that is case hardened for wear resistance of the outer surface and to create a compressive residual stress in the outer portion for load carrying capability. The outer shaft may include an inner portion that is not hardened by heat treating.

The sliding camshaft is for shifting to a selected one of a plurality of selectable cam lobes and includes and inner shaft and an outer shaft. The inner shaft configured with an external spline. The outer shaft has an inner surface, an outer surface, a coating, and an outer portion. The inner surface is subjectable to wear and is configured with an internal spline for transferring torque from and sliding axially on the external spline of the inner shaft. The outer surface is subjectable to wear and loading and is configured with the plurality of selectable cam lobes. The coating on the inner surface is for wear resistance. The outer portion is case hardened for wear resistance of the outer surface and to create a capacity for a compressive residual stress in the outer portion for load carrying capability. The outer shaft may include an inner portion that is not hardened by heat treating.

The method is for treating inner and outer surfaces of a hollow camshaft for improved life in an engine. The method includes case hardening an outer portion of the camshaft sufficiently to provide an outer surface wear resistance while leaving a core portion of the camshaft sufficiently soft to create a compressive residual stress in the outer portion to provide a load carrying capability; and coating the inner surface of the camshaft sufficiently to provide an inner surface wear resistance.

The outer shaft, the sliding camshaft, and the method provide wear resistance on the inner and outer surfaces and compressive residual stress in the outer portion of the outer shaft. This may enable operation under higher loading, which may improve performance. This disclosure applies to any machine or manufacture that includes a sliding camshaft or that includes any similar rotating shaft having a sliding outer shaft splined to an inner shaft.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 4 is a schematic cross-sectional perspective illustration of the sliding camshaft of FIG. 2, taken at line 3-3, showing only the outer shaft of the sliding camshaft, with all other parts removed for clarity.

FIG. 5 is a flow chart of a method for treating inner and outer surfaces of a hollow camshaft for improved life in an engine.

DETAILED DESCRIPTION

Figure 1:
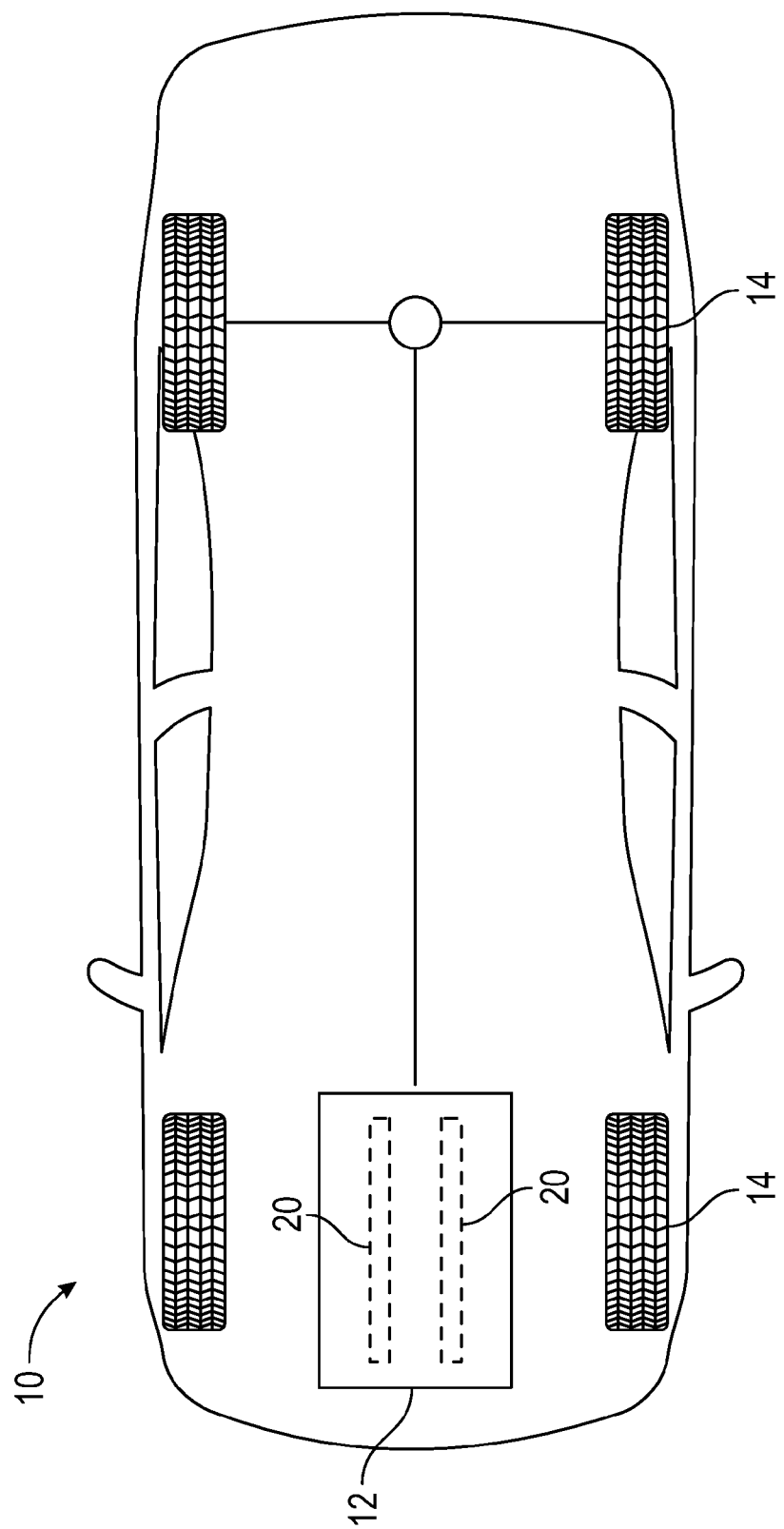
FIG. 1 is a schematic plan view illustration of a vehicle having an engine including a sliding cam shaft having an outer shaft with a coating on the inner surface for wear resistance and an outer portion that is case hardened for both wear resistance and load carrying capability.

Referring to the drawings, wherein like reference numbers refer to like components throughout the views, FIG. 1 shows a vehicle 10 including an engine 12 and wheels 14. The wheels 14 are operatively connected to the engine 12 to power the vehicle 10. The engine 12 includes a sliding camshaft 20, as best seen in FIG. 2.

Figure 2:
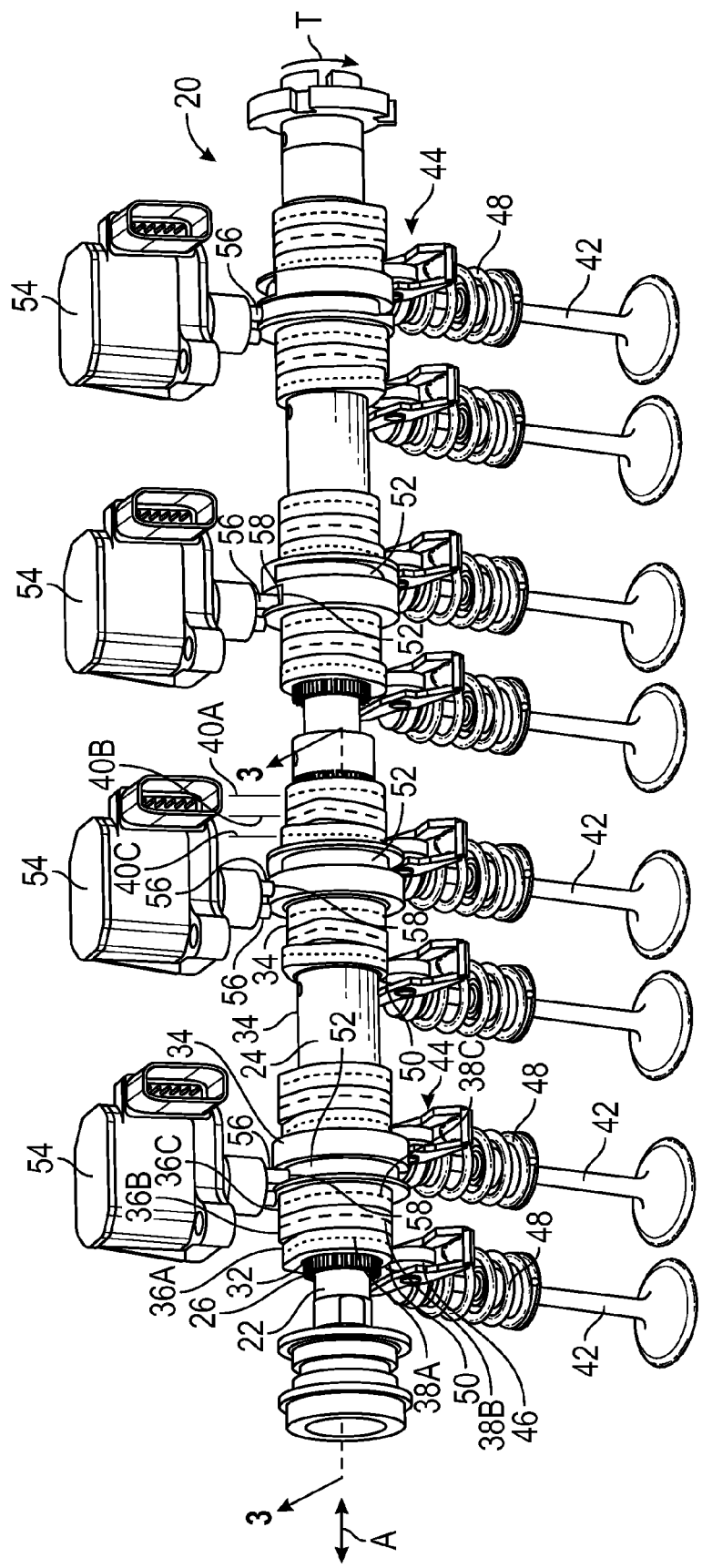
FIG. 2 is a schematic perspective illustration of the sliding camshaft of FIG. 1, showing greater detail and including several additional engine components.
Figure 3:
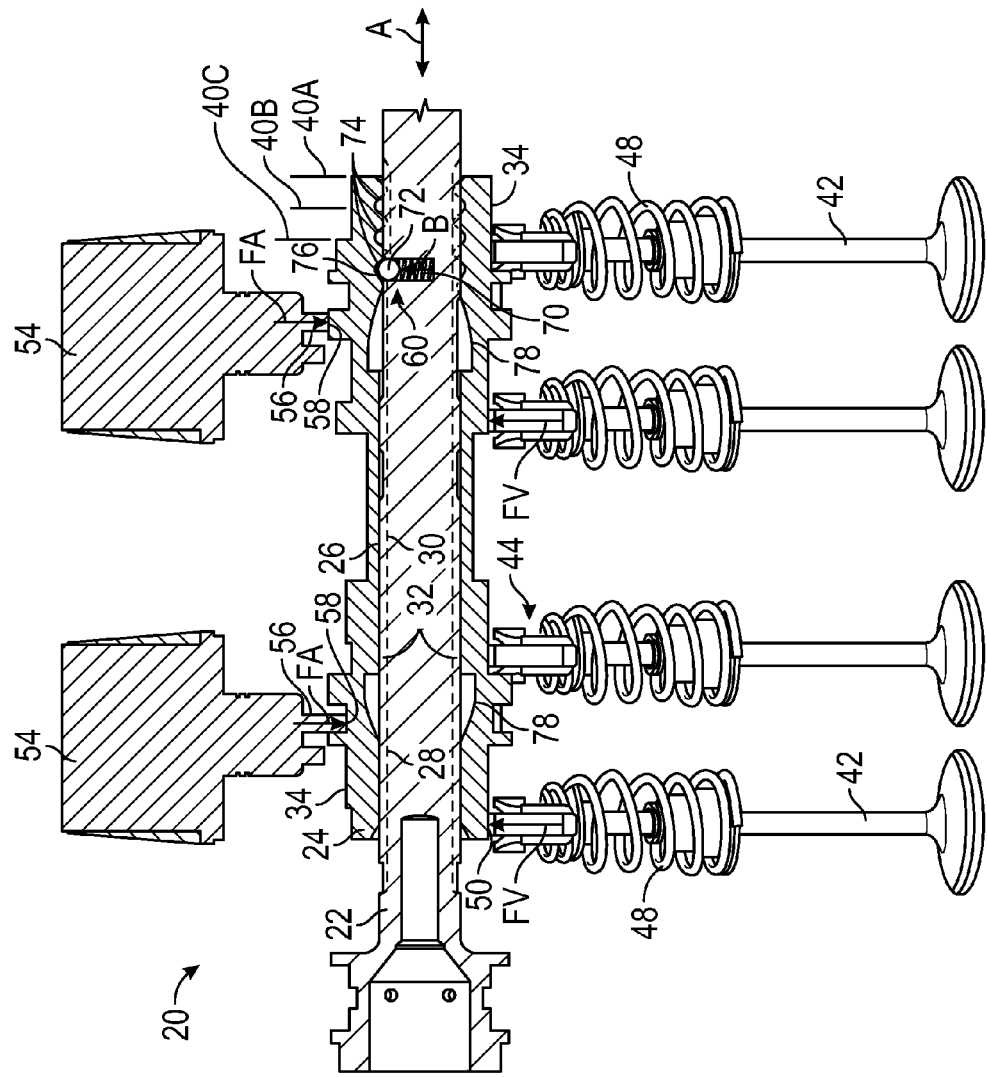
FIG. 3 is a fragmentary schematic cross-sectional illustration, partially in elevation, of the sliding camshaft of FIG. 2, taken at line 3-3 of FIG. 2.

Referring now to FIGS. 2-4, the sliding camshaft 20 is for shifting to a selected one of one or more selectable cam lobes 36A, 36B, 36C. The sliding camshaft 20 includes an inner shaft 22 and an outer shaft 24. The sliding camshaft 20 may include a plurality of outer shafts 24, as shown. The inner shaft 22 has an external spline 26. The outer shaft 24 has an inner surface 28 configured with an internal spline 30 for transferring a torque (arrow T) from the external spline 26 of the inner shaft 22 and for sliding axially (axis arrow A) on the external spline 26 of the inner shaft 22. The inner surface 28 is subjectable to wear at a first interface 32 between the internal spline 30 and the external spline 26.

The outer shaft 24 has an outer surface 34. The outer surface 34 is configured with the one or more selectable cam lobes 36A, 36B, 36C that have respective cam profiles 38A, 38B, 38C and that correspond to respective axial positions 40A, 40 B, 40C of the outer shaft 24 relative to the inner shaft 22. The selected cam lobe (shown as 36A in FIGS. 2 and 3) and its respective cam profile (shown as 38A in FIGS. 2 and 3) is selected by locating the outer shaft 24 at the respective axial position (shown as 40A in FIGS. 2 and 3).

The engine 12 includes a valve 42 and a cam follower mechanism 44 connecting the valve 42 to the selected cam lobe (shown as 36A in FIGS. 2 and 3) for opening and closing the valve 42 according to the respective cam profile (shown as 38A in FIGS. 2 and 3). The cam follower mechanism 44 may be a roller finger follower, as shown and as understood to those skilled in the art, or may be any other suitable cam follower mechanism. The cam follower mechanism 44 includes a cam follower 46. The cam follower 46 may be a roller, as shown, or may be any other type of cam follower. A valve spring 48 may be connected to the valve 42 and may bias the valve 42 to urge the valve 42 toward a closed position (not shown) in an engine cylinder (not shown) and toward the selected cam lobe (shown as 36A). The outer surface 34 of the outer shaft 24 is subjectable to both wear and valve loading (arrow FV) at a second interface 50 between the cam lobes 36A, 36B, 36C and the cam follower 46.

The outer surface 34 of the outer shaft 24 may be further configured with a shifting feature 52 for moving the outer shaft 24 axially (axis arrow A) relative to the inner shaft 22 to the respective axial position 40A, 40B, 40C that corresponds to the selected one of the plurality of selectable cam lobes 36A, 36B, 36C. The shifting feature 52 may be a groove, as shown, formed on the outer surface 34 of the outer shaft 24. The shifting feature 52 may be a barrel cam, a double S groove, or any other suitable shifting feature.

The engine 12 may include a shifting actuator 54 and an actuator pin 56 connected to the actuator 54. The actuator pin 56 may be cylindrical, as shown, or may be any other suitable shape. The shifting actuator 54 may move the actuator pin 56 into contact with the shifting feature 52 when in an actuated state and may withdrawal the actuator pin 56 from contact with the shifting feature 52 when in an unactuated state. The actuator pin 56 may cooperate with the shifting feature 52 to move the outer shaft 24 axially (axis arrow A) to the respective axial position 40A, 40B, 40C that corresponds to the selected one of the plurality of selectable cam lobes 36A, 36B, 36C when the shifting actuator 54 is in the actuated state. There may be more than one shifting feature 52 and more than one actuator pin 56, as shown. The outer surface 34 of the outer shaft 24 is subjectable to both wear and actuator loading (arrow FA) at a third interface 58 between the shifting feature 52 and the actuator pin 56.

The inner surface 28 of the outer shaft 24 may be configured with a locating feature 74 for temporarily locating the outer shaft 24 at the respective axial position 40A, 40B, 40C relative to the inner shaft 22 that corresponds to the selected one of the plurality of selectable cam lobes 36A, 36B, 36C. The inner surface 28 of the outer shaft 24 may be configured with a lightening feature 78 for reducing the mass of the outer shaft 24.

The sliding camshaft 20 may include a detent mechanism 60 including a biasing device 70 and a detent ball 72. The biasing device 70 may be disposed within the inner shaft 22, and may be a coil spring, as shown, or any other suitable biasing device. The detent ball 72 may be disposed between the biasing device 70, the inner shaft 22, and the outer shaft 24. The biasing device 70 applies a radially outward biasing force (arrow B) on the detent ball 72. The locating feature 74 may be a circumferential detent groove, as shown, formed on the inner surface 28 of the outer shaft 24. The locating feature may be configured to temporarily locate the outer shaft 24 at the respective axial position 40A, 40B, 40C relative to the inner shaft 22 by engaging the detent ball 72 of the detent mechanism 60. The inner surface 28 of the outer shaft 24 is subjectable to wear at a fourth interface 76 between the locating feature 74 and the detent ball 72.

The outer shaft 24 includes a coating 80 on the inner surface 28 for wear resistance. The coating 80 may be a tungsten disulfide coating, a diamond like coating, a ferritic nitro carburizing coating, or any other suitable coating for improving the wear resistance of the inner surface 28. The coating 80 improves the wear resistance of the inner surface 28 of the outer shaft 24 at the first interface 32 between the internal spline 30 and the external spline 26. The coating 80 may improve the wear resistance of the inner surface 28 of the outer shaft 24 at the fourth interface 76 between the locating feature 74 and the detent ball 72.

Referring now to FIG. 4, an outer portion 82 of the outer shaft 24 is case hardened or surface hardened for wear resistance of the outer surface 34 and to create a compressive residual stress in the outer portion 82 for load carrying capability. The outer portion 82 extends from the outer surface 34 to a border 83. Case hardening or surface hardening is defined as hardening the surface of a metal object while allowing the metal deeper underneath to remain soft, thus forming a layer of harder metal (called the "case") at the surface. The entire outer portion 82 may be case hardened. Alternatively, only selected portions of the outer portion 82 may be case hardened. The outer shaft 24 may have a core or inner portion 84 that is not hardened by heat treating and/or is softer or less hard than the outer portion 82. The core or inner portion 84 may extend from the inner surface 28 to the border 83. The outer portion 82 of the outer shaft 24 may be case hardened via a laser heat treatment, via an induction heat treatment, or via any other suitable thermal or mechanical case hardening or surface hardening process.

The case hardened outer portion 82 of the outer shaft 24 improves the wear resistance of the outer surface 34 of the outer shaft 24 at the second interface 50 between the cam lobes 36A, 36B, 36C and the cam follower 46 and improves the load carrying capability of the sliding camshaft 20. The case hardened outer portion 82 of the outer shaft 24 may also improve the wear resistance of the outer surface 34 of the outer shaft 24 at the third interface 58 between the shifting feature 52 and the actuator pin 56.

Referring now to FIG. 5, a method 100 of treating the inner surface 28 and the outer surface 34 of the hollow outer shaft 24 of the sliding camshaft 20 for improved life in an engine 12 is shown. The method 100 includes case hardening 102 the outer portion 82 of the hollow outer shaft 24 sufficiently to provide an outer surface wear resistance while leaving the core or inner portion 84 of the hollow outer shaft 24 sufficiently soft to create a compressive residual stress in the outer portion 82 to provide a load carrying capability. The method 100 includes coating 104 the inner surface 28 of the hollow outer shaft 24 sufficiently to provide an inner surface wear resistance.

Case hardening 102 the outer portion 82 may include case hardening via one of a laser heat treatment and an induction heat treatment. Coating 104 the inner surface 28 may include coating with one of a tungsten disulfide coating, a diamond like coating, and a ferritic nitro carburizing coating material. Any other suitable coating material may be used.

The outer surface wear resistance may provide wear resistance at the cam lobe to cam follower or second interface 50 and at the shifting feature to actuator pin or third interface 58. The load carrying capability may provide capability of the camshaft 20 to carry engine loads, including the valve loading FV and the actuator pin loading FA. The inner surface wear resistance may provide wear resistance at the internal spline 30 to external spline 26 or first interface 32 and at the locating feature to detent ball or fourth interface 76.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An outer shaft having an outer portion, an inner portion, an outer surface formed on the outer portion and subjectable to wear and loading, and an inner surface formed on the inner portion and subjectable to wear and configured with an internal spline for transferring torque from and sliding axially on an externally splined inner shaft, the outer shaft comprising:
    a coating on the inner surface for wear resistance;
    wherein the outer portion is case hardened for wear resistance of the outer surface such that the inner portion is softer than the case hardened outer portion to create a compressive residual stress in the outer portion for load carrying capability.

2. The outer shaft of claim 1, wherein the inner portion is not hardened by heat treating; and
    wherein the outer portion encircles the inner portion.

3. The outer shaft of claim 1, wherein the outer surface is configured with a shifting feature for moving the outer shaft axially relative to the inner shaft to a selected one of a plurality of selectable axial positions.

4. The outer shaft of claim 3, wherein the shifting feature is a groove formed on the outer surface of the outer shaft.

5. The outer shaft of claim 1, wherein the inner surface is further configured with a locating feature for temporarily locating the outer shaft at a selected one of a plurality of selectable axial positions relative to the inner shaft.

6. The outer shaft of claim 5, wherein the locating feature is a groove formed on the inner surface of the outer shaft.

7. The outer shaft of claim 1, wherein the outer surface is configured with a cam lobe.

8. The outer shaft of claim 1, wherein the case hardening of the outer portion is made by a laser heat treatment.

9. The outer shaft of claim 1, wherein the case hardening of the outer portion is made by an induction heat treatment.

10. The outer shaft of claim 1, wherein the coating is a tungsten disulfide coating.

11. The outer shaft of claim 1, wherein the coating is a ferritic nitro carburizing coating.

12. A sliding camshaft for shifting to a selected one of a plurality of selectable cam lobes, the sliding camshaft comprising:
    an inner shaft configured with an external spline; and
    an outer shaft having:
        an outer portion;
        an inner portion;
        an inner surface formed on the inner portion, subjectable to wear, and configured with an internal spline for transferring torque from and sliding axially on the external spline of the inner shaft;
        an outer surface formed on the outer portion, subjectable to wear and loading, and configured with the plurality of selectable cam lobes;
        a coating on the inner surface for wear resistance;
        wherein the outer portion is case hardened for wear resistance of the outer surface such that the inner portion is softer than the case hardened outer portion to create a compressive residual stress in the outer portion for load carrying capability.

13. The sliding camshaft of claim 12, wherein the inner portion is not hardened by heat treating; and
    wherein the outer portion encircles the inner portion.

14. The sliding camshaft of claim 12, wherein the outer surface of the outer shaft is further configured with a shifting feature for moving the outer shaft axially relative to the inner shaft to a selected one of a plurality of selectable axial positions that corresponds to the selected one of the plurality of selectable cam lobes.

15. The sliding camshaft of claim 12, wherein the shifting feature is a groove formed on the outer surface of the outer shaft.

16. The sliding camshaft of claim 12, wherein the inner surface of the outer shaft is further configured with a locating feature for temporarily locating the outer shaft at a selected one of a plurality of axial positions relative to the inner shaft that corresponds to the selected one of the plurality of selectable cam lobes.

17. The sliding camshaft of claim 16, further comprising a detent mechanism having:
    a biasing device disposed within the inner shaft; and
    a ball disposed between the biasing device, the inner shaft, and the outer shaft;
    wherein the biasing device applies an outward biasing force on the ball; and
    wherein the locating feature is a groove formed on the inner surface of the outer shaft and configured to temporarily locate the outer shaft at the selected one of the plurality of selectable axial positions relative to the inner shaft by engaging the ball of the detent mechanism.

18. A method of treating an inner surface formed on an inner portion and an outer surface formed on an outer portion of a hollow outer shaft of a sliding camshaft for improved life in an engine, the method comprising:
    case hardening the outer portion of the outer shaft of the sliding camshaft for wear resistance while leaving the inner portion of the outer shaft of the sliding camshaft softer than the case hardened outer portion to create a compressive residual stress in the outer portion for load carrying capability, wherein the outer portion encircles the inner portion; and
    coating the inner surface of the outer shaft of the sliding camshaft for inner surface wear resistance.

19. The method of claim 18, wherein the case hardening includes one of a laser heat treatment and an induction heat treatment.

20. The method of claim 18, wherein the coating includes one of a tungsten disulfide coating, a diamond like coating, and a ferritic nitro carburizing coating.

* * * * *